Nov. 15, 1927.
G. E. GOODING
1,649,523
BOX COVERING MACHINE
Filed Oct. 1, 1923
2 Sheets-Sheet 1
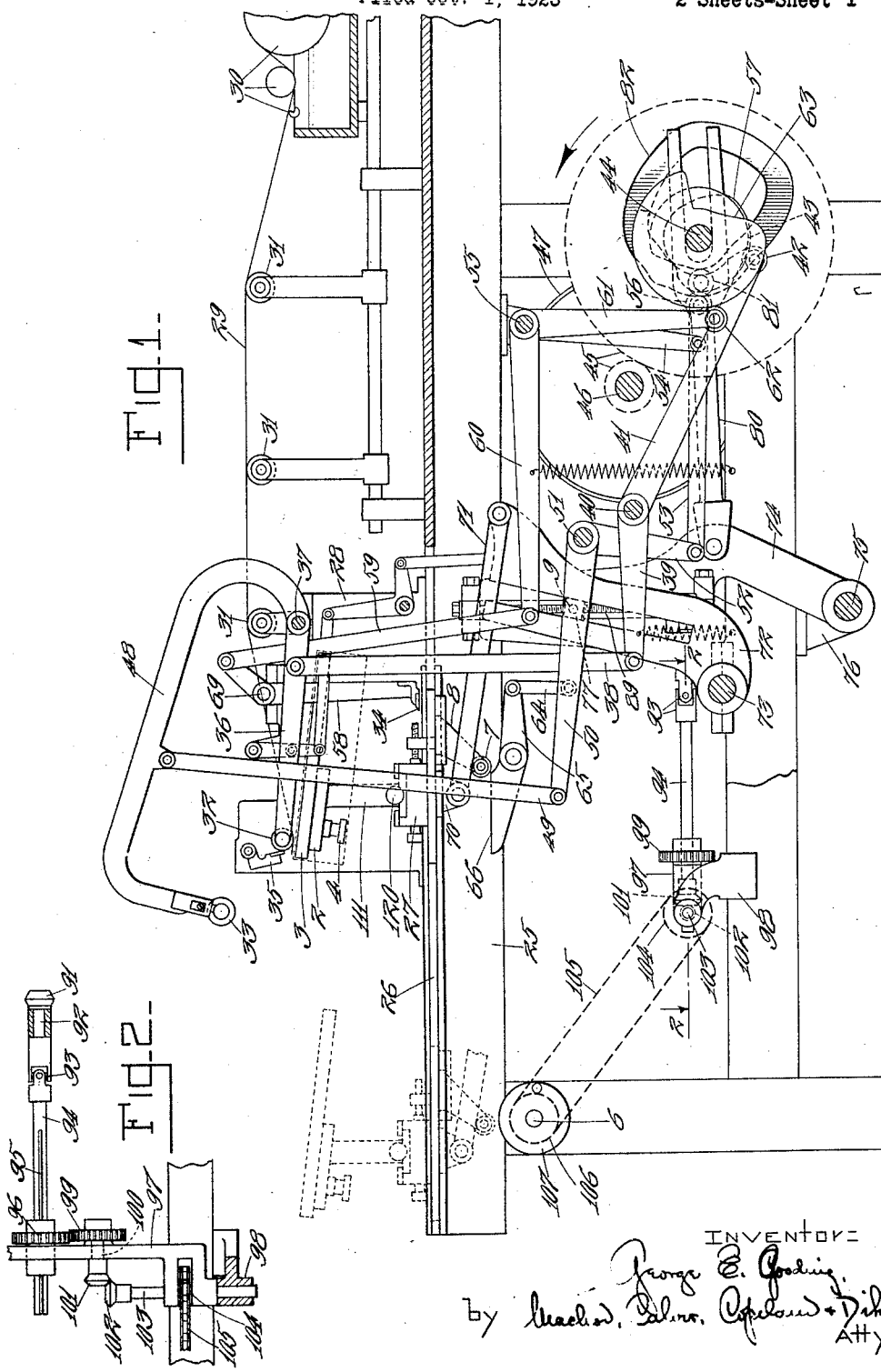
INVENTOR:
George E. Gooding.
by MacLeod, Calver, Copeland + Dike
Attys.

Nov. 15, 1927.  
G. E. GOODING  
1,649,523  
BOX COVERING MACHINE  
Filed Oct. 1, 1923  2 Sheets-Sheet 2
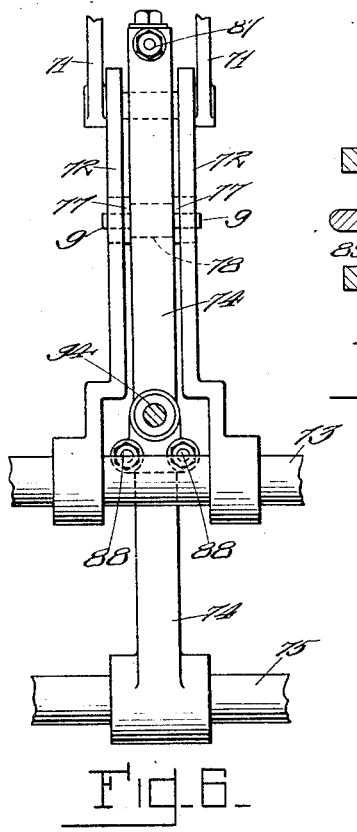
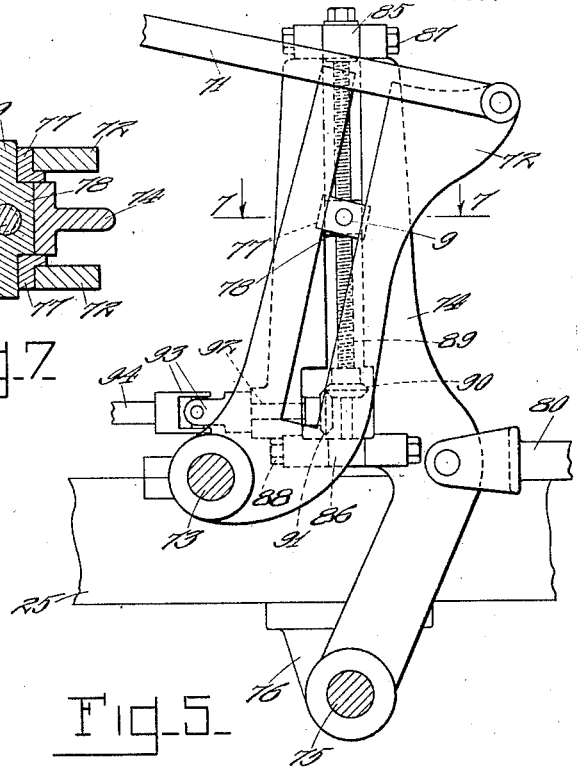
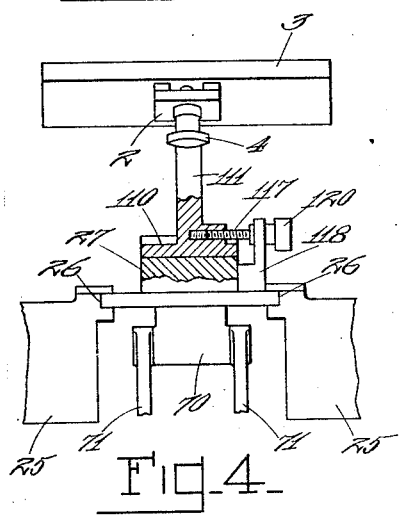
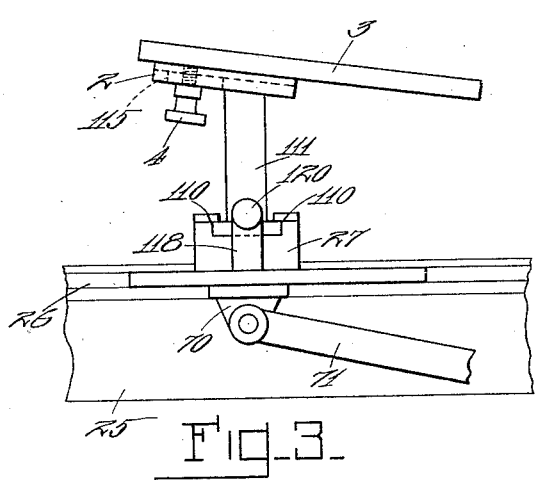
INVENTOR:  
George E. Gooding,  
by Macleod, Calver, Copeland & Dike  
Attys.

Patented Nov. 15, 1927.

1,649,523

UNITED STATES PATENT OFFICE.

GEORGE EDWARD GOODING, OF BOSTON, MASSACHUSETTS, ASSIGNOR TO JOHN T. ROBINSON COMPANY, OF HYDE PARK, MASSACHUSETTS, A CORPORATION OF MASSACHUSETTS.

BOX-COVERING MACHINE.

Application filed October 1, 1923. Serial No. 665,789.

This invention relates to machines of the general type disclosed and claimed in Letters Patent No. 1,289,729 issued December 31, 1918, to Harrison S. Gipe. The machine shown in said patent is designed for the purpose of applying paper or other covering material to the tops and bottoms of boxes whose sides and ends have previously been provided with a covering of similar material. Said machine comprises a work support on which the box is placed with the portion to be covered uppermost, said work support being mounted on a reciprocating carriage which is moved inwardly and outwardly past the devices for applying the covering material, the arrangement being such that when the carriage is in its innermost position the end of a web of covering material suitably coated with adhesive is applied to the outer edge of the box, and as the carriage moves outward said covering material is drawn from the supply and pressed down upon the box, the portion applied to the latter being subsequently severed from the web.

The present invention relates to the carriage and work support of a machine of this type, together with the means for operating the same, and has for its object to provide a work support which is readily adaptable to use in connection with boxes of different sizes and which is conveniently adjustable laterally during the operation of the machine in order properly to centre the covering material upon the work, together with improved actuating mechanism for said work support having provision whereby the same may be conveniently adjusted to vary the extent of movement of the work support carriage and thereby adapt the machine to different sizes of work.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise practised without departure from its spirit and scope.

In said drawings:

Fig. 1 is a simplified side elevation of the machine with the adjacent side frame partly broken away and certain of the parts, not essential to the invention claimed, omitted.

Fig. 2 is a horizontal section, taken substantially on the line 2—2, Fig. 1, of a portion of the mechanism for adjusting the carriage operating mechanism.

Fig. 3 is an enlarged side elevation of the work support carriage.

Fig. 4 is a front elevation, partly in section, of the parts shown in Fig. 3.

Fig. 5 is an enlarged side elevation of a portion of the mechanism for reciprocating the carriage.

Fig. 6 is a front elevation of the parts shown in Fig. 5.

Fig. 7 is a section taken substantially on the line 7—7, Fig. 5.

Except as hereinafter described, the machine herein shown, as to its general organization, may, if desired, be substantially as more fully disclosed in the patent to Gipe above referred to. Generally speaking, said machine comprises a main frame 25 provided with longitudinal ways 26 in which is slidably mounted a carriage 27 adapted to be reciprocated (by means hereinafter described) in said ways between the position shown in full lines in Fig. 1 and that shown in dotted lines therein. Supported above the path of movement of the carriage 27, in an auxiliary frame 28 mounted on the main frame 25, are the devices for applying the covering material 29 in the form of a web of paper or the like drawn from a suitable supply (not shown) passed through suitable devices 30 for applying adhesive thereto, and guided over supporting rollers 31 to its point of application to the box. The covering applying devices comprise a roller 32 for applying the free end of the web 29 to the box and a pressing roller 33 adapted, as the carriage moves outwardly drawing the web with it, to descend upon the box and press said web down upon the same. When the carriage has moved outwardly far enough to draw off a sufficient quantity of covering material to cover the box, said material is severed from the web by a movable cutter 34 which cooperates with a fixed cutter 35 on the auxiliary frame 28. The mechanisms for operating the rollers 32 and 33 and cutter 34 may, if desired, be substantially similar to the corresponding parts in the Gipe patent above referred to. As herein shown, however, the parts for operating the rollers 32 and 33 are of the construction and arrangement disclosed and claimed in application Serial No. 665,788, filed October 1, 1923, while those for operating the cutter 34 are substantially similar to those disclosed and claimed in application Serial No. 665,790 filed October 1, 1923. For the purpose of the present case these parts may be described as follows: The applying roller 32 is carried by a pair of arms 36 loosely mounted on a transverse rod 37 supported in the auxiliary frame 28. The arms 36 are connected by links 38 with arms 39 on a rock shaft 40, journalled in the frame 25. One of said arms 39 forms part of a bell crank, the other arm 41 of which is provided with a cam roller 42 cooperating with a cam 43 on a cam shaft 44 journalled in said frame. The cam shaft 44 is connected by gearing 45 with a main shaft 46 suitably journalled in the frame 25 and adapted to receive power from any suitable source through a belt pulley 47 thereon. The pressing roller 33 is carried by a pair of arms 48 also loosely mounted on the rod 37 and connected by links 49 with arms 50 on a rock shaft 51 journalled in the frame 25 and provided with an arm 52 to which is connected a link 53 supported by a link 54 from a rock shaft 55 journalled in said frame. The link 53 carries a cam roller 56 cooperating with a cam 57 on the cam shaft 44. One of the arms 50 is connected by a link 64 with a lever 65 fulcrumed on the frame 25 and formed with a bearing surface 66 which is engaged by a roller 7 on a bracket 8 longitudinally adjustable on the carriage 27, whereby the operation of the pressing roller 33 is controlled by the position of said carriage. The cutter 34 is carried by a bail 58 pivoted at 69 to the auxiliary frame 28 and connected by links 59 with arms 60 on the rock shaft 55. One of said arms 60 forms part of a bell crank, the other arm 61 of which is provided with a cam roller 62 cooperating with a cam 63 on the shaft 44.

The carriage 27 is formed at the under side between the ways 26 with a depending lug 70 connected by links 71 with a pair of levers 72 concentrically fulcrumed on a transverse rod 73 supported in the frame 25. Between the levers 72 is an intermediate lever 74 eccentrically fulcrumed with respect to the levers 72 on a second transverse rod 75 supported in hangers 76 from the frame 25. The levers 72 and 74 are formed with longitudinal slots to receive pivotally connected sliding blocks 77 and 78, respectively, the block 78, which is received in the slot in the lever 74, being herein shown as formed with oppositely extending trunnions 9 upon which the blocks 77, which are received in the slots in the levers 72, are pivotally mounted. The lever 74 is operated by a link 80 having a cam roller 81 co-operating with a cam 82 on the shaft 44, the end of said link 80 being forked to embrace the shaft 44, whereby said link is supported.

The sliding blocks 77 and 78 provide an adjustable connection between the levers 72 and 74 for varying the extent of the reciprocating movement given to the carriage 27 by the mechanism described. For the purpose of conveniently adjusting said connection while the machine is in operation, the following mechanism is employed.

The lever 74 is divided longitudinally into two parts which are connected by bolts 87 and 88, and between the ends of which are clamped bearings 85 and 86 for a longitudinally extending adjusting screw 89 in threaded engagement with the block 78. The bearings 85 and 86 constitute spacing blocks for separating the parts of the lever 74 to form the slot therein. The adjusting screw 89 has fast thereon a bevel gear 90 which meshes with a bevel gear 91 on a stem 92 journalled in the lever 74. The stem 92 is connected by a universal joint 93 with a shaft 94 having a feather 95 (Fig. 2) which engages a gear 96 through which said shaft passes, whereby said shaft and gear are connected for rotation in unison while permitting the former to telescope with the latter. The hub of the gear 96 is rotatably mounted in a frame 97 which is pivotally supported at its ends by brackets 98 on the sides of the frame 25. The gear 96 meshes with a gear 99 on a shaft 100 journalled in the frame 97 and having fast thereon a bevel gear 101 which meshes with a bevel gear 102 on a shaft 103 disposed concentrically with the pivotal axis of the frame 97. As herein shown, the shaft 103 is journalled in one of the brackets 98 and serves as a pivotal support for the adjacent end of said frame 97. Fast on the shaft 103 is a sprocket 104 which is connected by a chain 105 with a sprocket 106 on a shaft 6 journaled in the side of the frame 25 adjacent the front end thereof and having thereon a hand wheel or crank disk 107. It will be seen that by rotating the hand wheel 107, the blocks 77 and 78 may be longitudinally adjusted in their slots in the levers 72 and 74 to vary the connection between said levers and the consequent length of stroke of the carriage 27. The universal joint 93, telescoping shaft 94, and pivotally mounted frame 97 constitute provision for maintaining the operative connection between the parts of the mechanism on the oscillating lever 72 and those on the stationary portion of the frame.

The carriage 27 is formed on its upper side with transverse ways 110 in which is slidably mounted a work support 111 having a two-part head comprising a portion 2 integral with the body of said work support and an adjustable top or board 3 which is secured to the portion 2 by a clamp screw 4 passing through a longitudinal slot 115 in the portion 2, whereby boards 3 of different sizes corresponding to the boxes to be operated on may be interchangeably attached to the work support and may be adjusted thereon longitudinally, or in the direction of movement of the carriage 27, so as to position the boxes properly with respect to the covering applying devices.

The work support 111 and carriage 27 are adjustably connected by means of an adjusting screw 117 journalled in a bracket 118 on the side of said carriage and having threaded engagement with said work support. The adjusting screw 117 is provided with an operating head or hand wheel 120 conveniently located at the side of the carriage, whereby the said adjusting screw may be readily operated, even when the carriage is in motion, to move the work support laterally on said carriage. It is found that in machines of this type the web 29 frequently becomes offset laterally in one direction or the other to a slight extent, so that the covering is not properly centred on the boxes, and the resulting work is defective. It will be seen that with the construction described, the operator can, by a slight turn of the hand wheel 120, move the work support slightly in one direction or the other in order properly to centre the work with respect to the web 29 as the lateral position of the latter varies.

Having thus described my invention, I claim:

1. In a box covering machine, the combination with covering applying devices, of a work support carriage, and mechanism for reciprocating said carriage with respect to said covering applying devices, said mechanism including a plurality of eccentrically fulcrumed levers, and an adjustable connection between said levers to vary the stroke of said carriage.

2. In a box covering machine, the combination with covering applying devices, of a work support carriage, and mechanism for reciprocating said carriage with respect to said covering applying devices, said mechanism including a plurality of longitudinally slotted eccentrically fulcrumed levers, and pivotally connected blocks longitudinally adjustable in the slots of said levers.

3. In a box covering machine, the combination with covering applying devices, of a work support carriage, and mechanism for reciprocating said carriage with respect to said covering applying devices, said mechanism including a pair of concentrically fulcrumed levers, an eccentrically fulcrumed lever between said first named levers, all of said levers having longitudinal slots, and pivotally connected blocks longitudinally adjustable in said slots.

4. In a box covering machine, the combination with covering applying devices, of a work support carriage, and mechanism for reciprocating said carriage with respect to said covering applying devices, said mechanism including a pair of concentrically fulcrumed levers, an eccentrically fulcrumed lever between said first named levers, all of said levers having longitudinal slots, blocks longitudinally slidable in the slots in said first named levers, a block slidable in the slot in said last named lever and having trunnions on which said first named blocks are pivoted, and means for adjusting said last named block in its slot.

5. In a box covering machine, the combination with covering applying devices, of a work support carriage, and mechanism for reciprocating said carriage with respect to said covering applying devices, said mechanism including a plurality of eccentrically fulcrumed levers, means for operatively connecting said levers, and means carried by one of said levers for adjusting said connecting means.

6. In a box covering machine, the combination with covering applying devices, of a work support carriage, and mechanism for reciprocating said carriage with respect to said covering applying devices, said mechanism including a plurality of eccentrically fulcrumed levers, means for operatively connecting said levers, and a longitudinally disposed screw carried by one of said levers for ajusting said connecting means.

7. In a box covering machine, the combination with covering applying devices, of a work support carriage, and mechanism for reciprocating said carriage with respect to said covering applying devices, said mechanism including a plurality of longitudinally slotted eccentrically fulcrumed levers, pivotally connected blocks in the slots of said levers respectively, and means carried by one of said levers for adjusting said blocks in their respective slots to vary the stroke of said carriage.

8. In a box covering machine, the combination with covering applying devices, of a work support carriage, and mechanism for reciprocating said carriage with respect to said covering applying devices, said mechanism including a pair of concentrically fulcrumed levers, an eccentrically fulcrumed lever between said first named levers, all of said levers having longitudinal slots, pivotally connected blocks in said slots, and a longitudinally disposed screw carried by said last named lever and having threaded engagement with the block in the slot therein.

9. In a box covering machine, the combination with covering applying devices, of a work support carriage, and mechanism for reciprocating said carriage with respect to said covering applying devices, said mechanism including a pair of concentrically fulcrumed levers having longitudinal slots, an eccentrically fulcrumed lever between said first named levers, said last named lever being formed in two parts, means for clamping said parts together, spacing blocks interposed between the ends of said parts to provide a longitudinal slot therebetween, pivotally connected blocks longitudinally slidable in the slots of the several levers, and an adjusting screw journalled in said spacing blocks and having threaded engagement with the sliding block of said last named lever.

10. In a box covering machine, the combination with a frame, covering applying devices on said frame, and a work supporting carriage movable on said frame, of mechanism for reciprocating said carriage including a plurality of eccentrically fulcrumed levers and an operative connection between said levers, and means including operatively connected elements on said frame and one of said levers respectively for adjusting said connection to vary the stroke of said carriage.

11. In a box covering machine, the combination with a frame, covering applying devices on said frame, and a work supporting carriage movable on said frame, of mechanism for reciprocating said carriage including a plurality of eccentrically fulcrumed levers and an operative connection between said levers, means on one of said levers for adjusting said connection to vary the stroke of said carriage, means on said frame for operating said adjusting means, and means including an operating member and a shaft telescoping with said operating member for operatively connecting said adjusting means and operating means.

12. In a box covering machine, the combination with a frame, covering applying devices on said frame, and a work supporting carriage movable on said frame, of mechanism for reciprocating said carriage including a plurality of eccentrically fulcrumed levers and an operative connection between said levers, means on one of said levers for adjusting said connection to vary the stroke of said carriage, means on said frame for operating said adjusting means, and means including a universal joint for operatively connecting said adjusting means and operating means.

13. In a box covering machine, the combination with a frame, covering applying devices on said frame, and a work supporting carriage movable on said frame, of mechanism for reciprocating said carriage including a plurality of eccentrically fulcrumed levers and an operative connection between said levers, means on one of said levers for adjusting said connection to vary the stroke of said carriage, means on said frame for operating said adjusting means, and means including an operating member, a shaft telescoping with said operating member and a universal joint for operatively connecting said adjusting means and operating means.

14. In a box covering machine, the combination with a frame, covering applying devices on said frame, and a work supporting carriage movable on said frame, of mechanism for reciprocating said carriage including a plurality of eccentrically fulcrumed levers and an operative connection between said levers, a longitudinally disposed screw on one of said levers for adjusting said connection to vary the stroke of said carriage, means on said frame for operating said screw, and means for operatively connecting said screw and operating means.

15. In a box covering machine, the combination with a frame, covering applying devices on said frame, and a work supporting carriage movable on said frame, of mechanism for reciprocating said carriage including a plurality of eccentrically fulcrumed levers and an operative connection between said levers, a longitudinally disposed screw on one of said levers for adjusting said connection to vary the stroke of said carriage, means on said frame for operating said screw, and means including an operating member and a shaft telescoping with said operating member for operatively connecting said screw and operating means.

16. In a box covering machine, the combination with a frame, covering applying devices on said frame, and a work supporting carriage movable on said frame, of mechanism for reciprocating said carriage including a plurality of eccentrically fulcrumed levers and an operative connection between said levers, a longitudinally disposed screw on one of said levers for adjusting said connection to vary the stroke of said carriage, means on said frame for operating said screw, and means including a universal joint for operatively connecting said screw and operating means.

17. In a box covering machine, the combination with a frame, covering applying devices on said frame, and a work supporting carriage movable on said frame, of mechanism for reciprocating said carriage including a plurality of eccentrically fulcrumed levers and an operative connection between said levers, a longitudinally disposed screw on one of said levers for adjusting said connection to vary the stroke of said carriage, a gear on said lever for operating said screw, an operating member on said frame, a shaft telescoping with said operating member, and a universal joint connecting said shaft and gear.

In testimony whereof I affix my signature.

GEORGE EDWARD GOODING.